United States Patent [19]

Diaz

[11] Patent Number: 4,505,881
[45] Date of Patent: * Mar. 19, 1985

[54] AMMONIUM POLYSULFIDE REMOVAL OF HCN FROM GASEOUS STREAMS, WITH SUBSEQUENT PRODUCTION OF $NH_3$, $H_2S$, AND $CO_2$

[75] Inventor: Zaida Diaz, Houston, Tex.

[73] Assignee: Shell Oil Company, Houston, Tex.

[*] Notice: The portion of the term of this patent subsequent to Feb. 5, 2002 has been disclaimed.

[21] Appl. No.: 556,256

[22] Filed: Nov. 29, 1983

[51] Int. Cl.$^3$ .................. C01C 3/00; C01B 17/16; C01B 17/02

[52] U.S. Cl. .................. 423/236; 423/237; 423/355; 423/366; 423/437; 423/567 R; 423/567 A; 423/571; 423/563

[58] Field of Search .......... 423/236, 237, 567 R, 423/567 A, 571, 563, 355, 366, 437

[56] References Cited

U.S. PATENT DOCUMENTS

| | | | |
|---|---|---|---|
| 1,656,563 | 1/1928 | Koppe | 423/571 |
| 1,816,084 | 7/1931 | Koppe | 423/571 |
| 1,853,679 | 4/1932 | Hansen | 423/546 |
| 1,924,206 | 8/1933 | Hansen | 423/236 |
| 1,932,819 | 10/1933 | Hansen | 423/546 |
| 4,098,886 | 7/1978 | Nicklin et al. | 423/236 |

FOREIGN PATENT DOCUMENTS 47-47841 12/1972 Japan.
47-47842 12/1972 Japan.

*Primary Examiner*—Gregory A. Heller

[57] ABSTRACT

A process for the removal of HCN from gaseous streams is described, the process being characterized by reaction of the HCN in the gaseous stream with an ammonium polysulfide solution, formation of ammonium thiocyanate in solution, decomposition of ammonium polysulfide and precipitation of sulfur from the ammonium thiocyanate solution in a stripping zone, and hydrolysis of the ammonium thiocyanate. Recycle or recovery of sulfur and hydrolysis products are contemplated.

24 Claims, No Drawings

AMMONIUM POLYSULFIDE REMOVAL OF HCN FROM GASEOUS STREAMS, WITH SUBSEQUENT PRODUCTION OF $NH_3$, $H_2S$, AND $CO_2$

BACKGROUND OF THE INVENTION

The presence of hydrogen cyanide (HCN) in various gaseous streams complicates removal of additional impurities, e.g., removal of $H_2S$ or $CO_2$, and poses problems insofar as product quality and pollution control requirements are concerned. In particular, gas streams derived from the gasification of coal generally have significant minor quantities of HCN which must be dealt with before the gas is utilized.

Accordingly, a practical and efficient procedure for removing impurity HCN might have great economic importance. The invention is such a process.

In my copending application entitled HCN Removal, U.S. Ser. No. 556,257 filed even date herewith, there is described a process in which an HCN-containing gaseous stream is contacted with an ammonium polysulfide solution to form ammonium thiocyanate, at least a portion of the ammonium thiocyanate solution is removed from the contacting zone and the pH thereof is lowered to precipitate sulfur and release $H_2S$, and the remaining solution is subjected to hydrolysis conditions to produce $H_2S$, $NH_3$, and $CO_2$. A significant aspect of the invention in that application is the removal of sulfur prior to hydrolysis. The present invention also provides an efficient manner of sulfur removal.

SUMMARY OF THE INVENTION

The invention, therefore, relates to a process for the removal of HCN from gaseous streams containing this impurity, the process comprising contacting or scrubbing the gaseous stream with a solution containing ammonium polysulfide under conditions to convert or react with the HCN and produce a solution containing ammonium polysulfide and ammonium thiocyanate. The gaseous stream, now having a reduced HCN content, is passed out of the contact zone, for use, further treatment, or recovery. At least a portion of the solution containing ammonium polysulfide and ammonium thiocyanate is removed from the contact zone, preferably on a continuous basis. In accordance with the invention, removed solution is sent to a stripping zone where the solution is stripped. The stripping action results in the decomposition of ammonium polysulfide, the stripping of $H_2S$ and $NH_3$ (and any other gases present) from the solution, and the precipitation of solid sulfur in the stripping zone. The precipitated sulfur may be removed or forwarded with the solution or mixture formed to a hydrolysis zone. The hydrolysis is carried out under appropriate conditions of temperature and pressure, and ammonia, carbon dioxide, and hydrogen sulfide are produced. These gases, as well as the gases stripped in the stripping zone, may be recycled and/or recovered, if desired, by known techniques. The process is preferably operated continuously.

DETAILED DESCRIPTION OF THE INVENTION

The reactions for the process may be shown, as follows:

$$2HCN + (NH_4)_2S_x \rightarrow 2NH_4SCN + HS^- + H^+ + S_{x-3}$$
(x = 3, 4, or 5)

$$NH_4SCN + 2H_2O \rightarrow CO_2 + H_2S + 2NH_3$$

$$(NH_4)_2S_x \rightarrow 2NH_3 + H_2S + S_{(x-1)}$$

The particular gas streams treated according to the invention are not critical, as will be evident to those skilled in the art. Any gaseous stream containing HCN and from which it is desired to remove the HCN, and which itself does not react with the ammonium polysulfide or interfere substantially therewith may be treated according to the invention. Gaseous streams or effluents particularly suited to the invention include fuel gases produced by gasification procedures, e.g., fuel or effluent gases derived from or produced by the gasification of coal, petroleum, shale, tar sands, etc., wherein a significant quantity of HCN is present. In such gasification processes, the gaseous effluents are often quenched with water or gaseous liquids, and gaseous streams derived from stripping the liquids may contain HCN and may also be treated by the invention. The HCN content of such streams may vary, but the invention will preferably be employed with streams having an HCN content of from 0.002 percent to 0.1 percent by volume. As indicated, the process of the invention is preferably continuous, i.e., make-up ammonium sulfide or polysulfide is continuously supplied to the contact zone, and a portion or "bleed" of ammonium thiocyanate solution is continuously removed from the contact zone. The volumes of make-up and bleed will depend, inter alia, on the concentration of HCN in the gaseous stream, and thus cannot be given with precision. Those skilled in the art may suitably adjust solution flows.

Suitable conditions, i.e., appropriate temperature and pressure, sufficient contact time, proper pH, and appropriate concentrations of ammonium polysulfide and water are employed to achieve the HCN conversion. Temperatures in the contact zone of from about 20° C. to about 80° C. may be employed, with temperatures of from 25° C. to 60° C. being preferred. The pH of the ammonium polysulfide solutions will range from about 8 to 10, preferably 8.5 to 9.5, and concentrations of ammonium polysulfide will preferably range from 0.01 to 1, preferably 0.1 to 0.5 moles per liter. The most important variable controlling HCN removal and conversion is the amount of elemental sulfur available to maintain the polysulfide concentration. In general, the polysulfide solution will have at least a stoichiometric amount of the polysulfide sulfur with respect to the HCN, and preferably up to 3 or 4 times the stoichiometric amount. Elemental sulfur may be supplied in the contact zone to maintain this concentration. $H_2S$ and $NH_3$ in the feed gas do not interfere with HCN removal or conversion, and $NH_3$ may actually help rejuvenate the solution. The ammonium polysulfide solution may be supplied on a continuous basis to the contact zone as make-up, or steps can be taken, in some cases, to generate the ammonium polysulfide to some extent in situ. Contact times may range from 1 to 8 minutes, preferably 3 to 5 minutes. Those skilled in the art may select suitable contact or scrubbing devices to carry out the contacting or scrubbing.

As the HCN is removed from the gaseous stream by reaction with the ammonium polysulfide solution, at least a portion of the solution, now containing ammonium thiocyanate, is removed. The portion removed may be stripped by heating, contact with a non-reactive gas, or a combination of heating and gas flow stripping. The stripping decomposes ammonium polysulfide, producing $H_2S$ and $NH_3$, and precipitating sulfur. While a separate stripping zone may be provided, it is an advantage of the invention that the portion or stream may be supplied to a suitable stripping zone in a given process. For example, the portion may be supplied to a sour water stripping zone. As used herein, the term "sour water" refers to water containing $H_2S$ and $NH_3$, such a composition or streams thereof being commonly available in refinery, gasification process, or other industrial operations. In such a case, the $H_2S$ and ammonia from the decomposition of the ammonium polysulfide may be recovered or treated with the stripped $H_2S$ and ammonia from the sour water. Sour water streams may also contain extraneous matter, such as fines or solids, if the sour water stream is derived from washing operations. In general, such streams will contain from about 0.005 percent by weight to about 1.3 percent by weight $H_2S$, and about 0.03 percent by weight to about 0.6 percent by weight of $NH_3$. If present, solids or fines may be present from infinitesmal amounts to say, amounts of from about 2 percent by weight to about 5 percent by weight, and their presence or absence may determine final treatment or disposal of sulfur precipitated in the stripping zone.

Whatever the case, as indicated, the solution or solution-sour water mixture may be stripped by heating or use of flow of a non-reactive gas (or both). If heat alone is applied to the solution or mixture, sufficient heat will be supplied to decompose the ammonium polysulfide. Again, if heating is employed, it may be necessary to cool the stripped gases before further treatment. Suitable devices for this approach include, for example, a conventional packed or tray column with a re-boiler. Generally, temperatures on the order of about 80° C. to about 120° C., preferably about 90° C. to about 110° C., will be sufficient to decompose the ammonium polysulfide and precipitate sulfur.

If a non-reactive gas is employed, it will be supplied at a suitable pressure, e.g., 4 atmospheres to 15 atmospheres, to strip $H_2S$ and $NH_3$ from the ammonium polysulfide containing solution. Any suitable stripping device may be used, such as a packed column or a tray column. Different devices may be used (whether stripping is accomplished by heat, gas flow, or a combination thereof) where plugging by solids may be a problem. In any event, any suitable non-reactive gas may be employed. As used herein, the term "non-reactive" implies that the gas, (or reactant products thereof with components of the sour water-solution mixture) does not convert the ammonium thiocyanate in the removed solution to an undesired species, such as back to HCN, to any substantial extent. In general, gases non-reactive to ammonium thiocyanate, i.e., those that do not react with the ammonium thiocyanate in the portion to any substantial extent under the conditions employed, may be used. Suitable gases, under the conditions in the stripping zone, include air, steam, carbon dioxide, oxygen, nitrogen, and inert gases. Steam is much preferred, since it can provide heat for the stripping and may be condensed easily, leaving a relatively concentrated $H_2S$-$NH_3$ stream. Those skilled in the art may adjust volumes and velocities of the stripping gas to appropriate levels. As indicated, heat may be supplied in the case of a stripping gas to assist the stripping.

The stripped gas or gases may be recovered or treated, as desired. Thus, the $H_2S$ and $NH_3$ stripped may be returned to make-up for ammonium polysulfide, or may be sent to conventional gas clean-up steps. Alternately, the $NH_3$ and $H_2S$ may be separated, such as by use of a two section stripping zone with alternate acid addition and base addition in the zones to free the respective gases.

Precipitated sulfur is preferably removed from the remaining mixture or solution prior to hydrolysis. This may be accomplished by filtration or other appropriate technique. For example, since the temperature of the mixture or solution is ultimately to be raised to hydrolysis conditions, the temperature of the mixture may be raised to a point sufficient to melt the sulfur but not sufficient to cause hydrolysis of the ammonium thiocyanate. The molten sulfur may then be easily removed. If the volume of solids in the sour water is high, and the amount of sulfur is low, sulfur recovery may be uneconomic, and the recovered "sludge" may simply be sent to waste. Finally, the sulfur may simply be melted in the hydrolysis zone and recovered, recycled, or sent to waste.

Assuming prior sulfur removal, the ammonium thiocyanate-containing remaining mixture or solution is forwarded to a hydrolysis zone where it is subjected to conditions to hydrolyze the ammonium thiocyanate. Water may be added, if necessary. The $NH_3$, $H_2S$, and $CO_2$ may be recovered or sent to conventional gas treatment steps. Temperatures in the hydrolysis zone are important, and will range from about 200° C. to about 300° C. In general, pressures will range from about 20 to about 100 atmospheres.

If sulfur recovery is made before the hydrolysis step, quite minor amounts of sulfur still may remain in the solution to be hydrolyzed. In that event, suitable provision may be made for recovery or removal to waste of this minor quantity. The residual stream, after the ammonium thiocyanate hydrolysis, may be treated further, or may be used in other plant operations.

In order to demonstrate the removal of HCN from a gaseous stream, the following experiments were conducted.

PROCEDURE

A stream of nitrogen containing 1 percent by volume HCN and 0.5 percent by volume $H_2S$ was passed at atmospheric pressure at a rate of 2 volumes of gas per volume of solution per minute into a flask containing a 0.3 M solution of ammonium sulfide having 1.56 M sulfur suspended therein. The pH of the solution was 8.9, and the volume of gas treated was about 210 volumes of gas per volume of solution. Temperature of the system was maintained at about 80° C. Greater than 99.8 percent of the HCN was removed, and conversion to thiocyanate approached 100 percent.

In a similar manner, a series of runs was made, and the conditions and results are, as set out below:

Solution: 0.30 M $(NH_4)_2S$
Gas Composition: 1% HCN in $N_2$; $H_2S$ and $NH_3$ content as indicated below
Gas Flow Rate: 290–330 cc/min.
Pressure: 1 atm
Volume of HCN/Volume of Solution ~2.1 cc/cc

| T (°C.) | Elemental Sulfur in Solution (M) | Initial Solution pH | $NH_3$ in Feed (% v) | $H_2S$ in Feed (% v) | HCN Removed (%) | HCN Converted (%) |
|---|---|---|---|---|---|---|
| 25 | 1.6 | 8.8 | 0 | 0.55 | >99.8 | 99 |
| 50 | 1.6 | 9 | 0 | 0.45 | >99.8 | 97 |
| 80 | 1.6 | 8.9 | 0 | 0.55 | >99.8 | 100 |

-continued

| T (°C) | Elemental Sulfur in Solution (M) | Initial Solution pH | NH$_3$ in Feed (% v) | H$_2$S in Feed (% v) | HCN Removed (%) | HCN Converted (%) |
| --- | --- | --- | --- | --- | --- | --- |
| 50 | 1.6 | 7 | 0 | 0.55 | >99.4 | 98 |
| 50 | 0.3 | 9 | 0 | 0.55 | >99.8 | 97 |
| 50 | 0.06 | 9 | 0 | 0.55 | >98 | 76 |
| 50 | 0.5 | 9 | 1 | 0.55 | >99.8 | 100 |
| 50 | 0.5 | 7 | 1 | 0.55 | >99.4 | 96 |

What is claimed is:

1. A process for removing HCN from a gaseous stream containing HCN comprising
    (a) contacting said gaseous stream in a contact zone with a solution containing ammonium polysulfide under conditions to convert HCN, and producing a solution containing ammonium polysulfide and ammonium thiocyanate, and a gas stream having reduced HCN content;
    (b) removing solution containing ammonium polysulfide and ammonium thiocyanate from the contact zone, and stripping H$_2$S and NH$_3$ from said solution in a stripping zone, producing a remaining solution containing sulfur and having reduced ammonium polysulfide content; and
    (c) hydrolyzing ammonium thiocyanate in said remaining solution and producing NH$_3$, H$_2$S, and CO$_2$.

2. The process of claim 1 wherein sulfur is separate from the remaining solution prior to hydrolysis in step (c).

3. The process of claim 1 wherein the amount of ammonium polysulfide solution supplied in step (a) contains at least a stoichiometric amount of polysulfide sulfur with respect to the hydrogen cyanide.

4. The process of claim 1 wherein the solution is stripped by heating sufficiently to decompose the ammonium polysulfide.

5. The process of claim 2 wherein the solution is stripped by heating sufficiently to decompose the ammonium polysulfide.

6. The process of claim 3 wherein the solution is stripped by heating sufficiently to decompose the ammonium polysulfide.

7. The process of claim 1 wherein the solution is stripped by flow of a non-reactive gas.

8. The process of claim 2 wherein the solution is stripped by flow of a non-reactive gas.

9. The process of claim 3 wherein the solution is stripped by flow of a non-reactive gas.

10. The process of claim 1 wherein the solution is stripped by application of heat and flow of a non-reactive gas.

11. The process of claim 2 wherein the solution is stripped by application of heat and flow of a non-reactive gas.

12. The process of claim 3 wherein the solution is stripped by application of heat and flow of a non-reactive gas.

13. A process for removing HCN from a gaseous stream containing HCN comprising
    (a) contacting said gaseous stream in a contact zone with a solution containing ammonium polysulfide under conditions to convert HCN, and producing a solution containing ammonium polysulfide and ammonium thiocyanate, and a gas stream having reduced HCN content;
    (b) removing solution containing ammonium polysulfide and ammonium thiocyanate from the contact zone and passing removed solution to a sour water stripping zone, forming a sour water-removed solution mixture, and stripping H$_2$S and NH$_3$ from said mixture in said stripping zone, and producing a remaining solution containing sulfur and having reduced ammonium polysulfide content; and
    (c) hydrolyzing ammonium thiocyanate in said remaining solution and producing NH$_3$, H$_2$S, and CO$_2$.

14. The process of claim 13 wherein sulfur is separated from the remaining solution prior to hydrolysis in step (c).

15. The process of claim 13 wherein the amount of ammonium polysulfide solution supplied in step (a) contains at least a stoichiometric amount of polysulfide sulfur with respect to the hydrogen cyanide.

16. The process of claim 13 wherein the mixture is stripped by heating sufficiently to decompose the ammonium polysulfide.

17. The process of claim 14 wherein the mixture is stripped by heating sufficiently to decompose the ammonium polysulfide.

18. The process of claim 15 wherein the mixture is stripped by heating sufficiently to decompose the ammonium polysulfide.

19. The process of claim 13 wherein the mixture is stripped by flow of a non-reactive gas.

20. The process of claim 14 wherein the mixture is stripped by flow of a non-reactive gas.

21. The process of claim 15 wherein the mixture is stripped by flow of a non-reactive gas.

22. The process of claim 13 wherein the mixture is stripped by application of heat and flow of a non-reactive gas.

23. The process of claim 14 wherein the mixture is stripped by application of heat and flow of a non-reactive gas.

24. The process of claim 15 wherein the mixture is stripped by application of heat and flow of a non-reactive gas.

* * * * *